Sept. 4, 1923.  G. W. STAFFORD  1,466,969
AUTOMOBILE SEAT
Filed Nov. 22, 1921
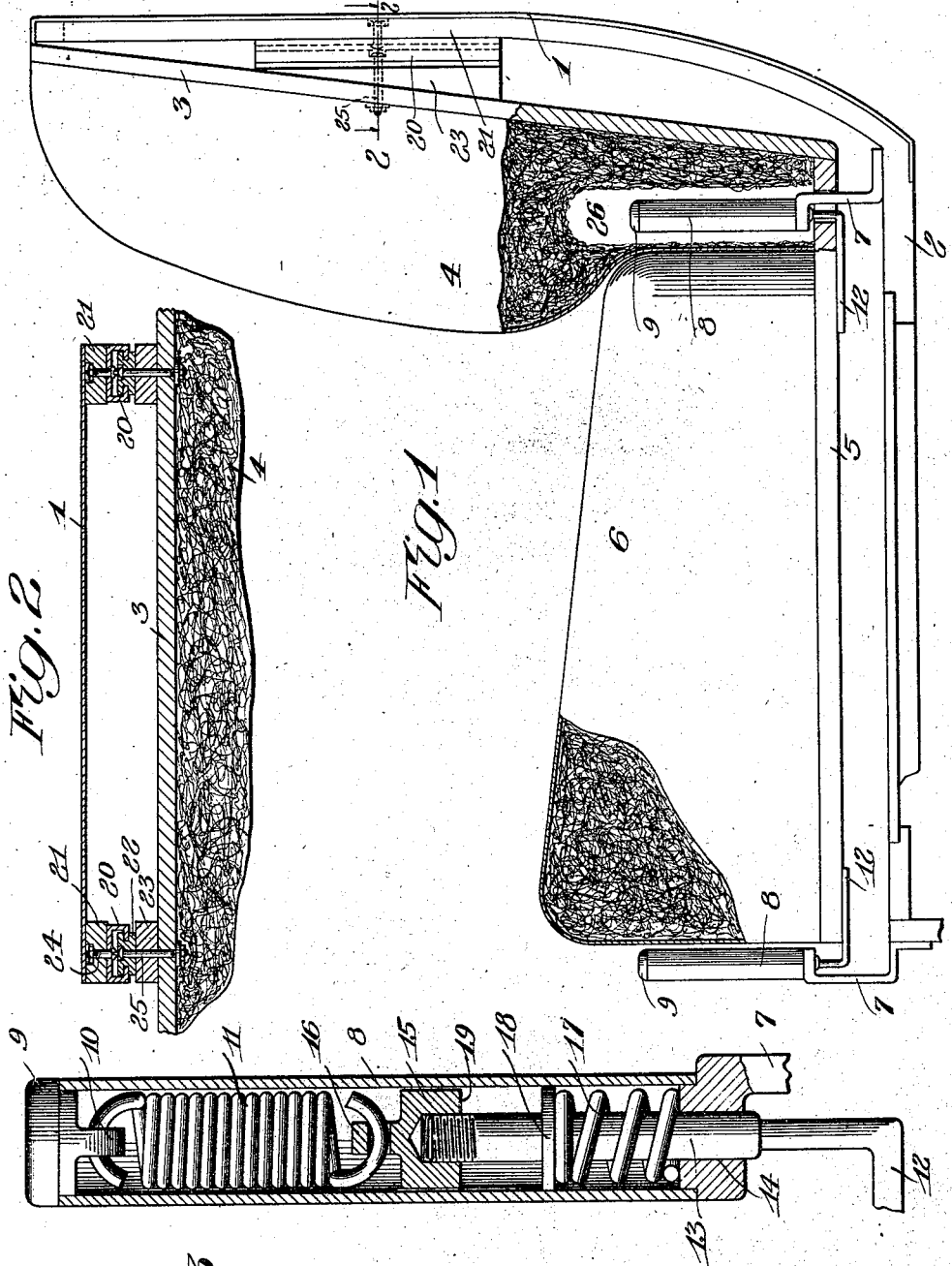

Patented Sept. 4, 1923.

1,466,969

UNITED STATES PATENT OFFICE.

GEORGE WENDLING STAFFORD, OF ROCHESTER, NEW YORK.

AUTOMOBILE SEAT.

Application filed November 22, 1921. Serial No. 517,094.

*To all whom it may concern:*

Be it known that I, GEORGE W. STAFFORD, of Rochester, in the county of Monroe and State of New York, have invented certain new and useful Improvements in Automobile Seats; and I do hereby declare the following to be a full, clear, and exact description of the same, reference being had to the accompanying drawings, forming a part of this specification, and to the reference numerals marked thereon.

My present invention relates to vehicle seats, of a kind designed to reduce or absorb the shocks incident to traveling over uneven ground, and it has for its object to provide an improved seat of this character particularly adapted for use in connection with automobiles. The improvements are directed in part toward eliminating the multiplicity of springs ordinarily used in the upholstery of the seat; toward providing a simple, inexpensive and durable cushioning device for the seat that may be arranged in an inconspicuous manner and toward so relating the seat and back that the objectionable rubbing of the passenger's back against the seat back as the seat vibrates under him is eliminated. To these and other ends the invention consists in certain improvements and combinations of parts, all as will be hereinafter more fully described, the novel features being pointed out in the claims at the end of the specification.

In the drawings:

Figure 1 is an end view of a portion of a vehicle frame provided with a seat constructed in accordance with and illustrating one embodiment of my invention, certain portions being shown in detail or broken away;

Figure 2 is a horizontal fragmentary section on the line 2—2 of Figure 1, and

Figure 3 is a vertical sectional view through one of the cushioning devices.

Similar reference numerals throughout the several views indicate the same parts.

Referring more particularly to the drawings, 1 indicates the back support and 2 the seat support of a vehicle frame such as an automobile body. Disposed adjacent to these are respectively a back 3 provided with upholstery 4 and a seat 5 provided with upholstery 6. The back and seat are rigidly connected together or at least so joined that they will move up and down together, and the upholstery 4 and 6, is preferably merely a hair or similar stuffing without the use of the usual springs for reasons that will hereinafter appear.

The seat 5 is preferably rectangular or approximately so and is supported in the present instance by a plurality of cushioning devices, one of which is arranged in the region of each corner thereof. Each such device embodies a bracket 7 secured to and extending upwardly from the seat support 2 and carrying a vertically disposed tubular spring casing 8. The top of such casing is closed by a plug 9 having a depending eye 10 on its under side from which is suspended an extensible coil spring 11. Secured to the seat 5 adjacent to the spring casing is a suitably formed bracket 12 terminating in a vertical rod 13 that extends upwardly through the bottom of the casing 8 and has a bearing for sliding movement in the head of the bracket 7 as indicated at 14 in Figure 3. A cap piece 15 is threaded onto the upper end of the rod 13 and provided with an eye 16 engaging the lower end of the spring 11 from which latter the rod, bracket and attached seat are thus suspended. There is normally a space between the seat 5 and the seat support 2 of the frame, as shown in Figure 1 so that as the weight of the occupant is assumed by the seat and the springs 11 are flexed there is an opportunity for the seat to rise and fall as the shocks of the road are absorbed by the spring cushioning device.

The springs 11 are sensitive enough to yield gently and smoothly to ordinary shocks, but in case they are unduly extended means are provided to act as a buffer and prevent the seat 5 from striking the seat support 2 with any force. For this purpose I coil about the rod 13 at the bottom of the spring casing 8 a compression spring 17 upon the top of which rides freely a washer 18. When an extreme downward strain is imposed upon the spring 11 and it is stretched sufficiently the cap pieces 15 provides a shoulder 19 that strikes the washer 18 so that the cushioning effect of the spring 17 is added and this combined with the resistance of spring 11 is sufficient to gradually arrest an extreme downward movement of the seat 5.

As before stated the seat 5 and back 3 are connected in such manner as to move together as the seat rises and falls on its cushioning devices. This is of advantage because it saves the occupant the discomfort of bobbing up and down on a yielding seat with his back against a relatively fixed back member that only serves to rub and wear his clothes. This is the effect when springs are used in upholstery seats, but as before stated I eliminate these springs and provide the cushioning devices for the whole structure to do their work. This being the case it is preferable to provide guides for directing the movement of the back 3 with reference to the back support 1, and in the present instance I provide cooperating vertical guiding elements on the back and back support respectively near both ends of the former, as shown in Figure 2. These guides consist in the present instance of a channel member 20 mounted on a block 21 on the rear of the back 3 and a T-shaped member 22 of complementary form mounted on a block 23 secured to the back support 1 of the frame. These guiding elements are preferably pivotally mounted at their centers on bolts 24 and 25 so that if the two ends of the seat do not rise and fall equally the guides will not bind and will permit the seat to have a rocking or tilting motion giving it the requisite freedom to develop the full cushioning effect of the springs 11.

The vehicle seat constructed in accordance with my invention saves the occupant to a surprising extent from the shocks and jars of the road. The cushioning devices are sightly and adapted to be rendered inconspicuous. In fact I prefer to extend the rear brackets 7 through the seat 5 so that the spring casings 8 may be hidden in a cavity 26 in the upholstery 4.

I claim as my invention:

1. In a vehicle seat, the combination with a vehicle frame and a plurality of vertical tubular spring casings carried thereby, of a seat, rigid brackets on the seat extending into the spring casings and terminating in cap pieces, plugs in the upper ends of the casings, tension springs in the latter having their upper ends supported from the plugs and their lower ends connected to the cap pieces to support the same, and compression springs arranged in the bottoms of the casings and adapted to take the thrust of the cap pieces when the tension springs are abnormally flexed.

2. In a vehicle seat, the combination with a vehicle frame and a plurality of vertical tubular spring casings carried thereby, of a seat, rigid brackets on the seat extending into the spring casings and terminating in cap pieces, having a guiding fit in the casings, tension springs in the latter having their upper ends supported from the upper ends of the casings and their lower ends connected to the cap pieces to support the same, and compression springs arranged in the bottoms of the casings and adapted to take the thrust of the cap pieces when the tension springs are abnormally flexed.

3. In a vehicle seat, the combination with a vehicle frame, a plurality of upright tubular spring casings carried thereby, plugs in the upper ends of the casings and extension springs suspended from the plugs, of a seat, brackets on the seat extending upwardly into the spring casings from beneath the same and supported by the springs, each bracket being provided with a shoulder and comprising springs arranged in the bottoms of the casings and adapted to be engaged by the shoulders on the brackets when the extension springs are abnormally flexed.

4. In a vehicle seat, the combination with a vehicle frame and rigidly connected back and seat portions movable relatively thereto and provided with upholstery, of a cushioning device on the frame supporting the seat and back and comprising a tubular spring casing located within the upholstery of the back, a bracket on the seat extending upwardly into the spring casing, and a spring in the latter acting between the casing and bracket.

GEORGE WENDLING STAFFORD.